United States Patent
Logan et al.

(10) Patent No.: US 6,666,501 B1
(45) Date of Patent: Dec. 23, 2003

(54) LIGHTWEIGHT AUTOMOBILE BODY STRUCTURE

(75) Inventors: Stephen D Logan, Northville, MI (US); David W Gostovich, Oxford, MI (US); Suresh Nagesh, West Bloomfield, MI (US); William W Doolittle, III, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/198,297

(22) Filed: Jul. 17, 2002

(51) Int. Cl.[7] ............................................. B62D 25/20
(52) U.S. Cl. ............. 296/193.07; 296/185; 296/203.01
(58) Field of Search ................................. 296/193, 185, 296/204, 187, 188, 189, 197, 203.01, 203.03, 75

(56) References Cited

U.S. PATENT DOCUMENTS

| | | | | |
|---|---|---|---|---|
| 3,202,451 A | * | 8/1965 | Auger et al. ................. 296/204 |
| 3,423,122 A | * | 1/1969 | Wessells ..................... 296/185 |
| 3,940,176 A | * | 2/1976 | Ito et al. ..................... 296/188 |
| 4,428,599 A | * | 1/1984 | Jahnle ......................... 296/185 |
| 4,898,419 A | * | 2/1990 | Kenmochi et al. .......... 296/204 |
| 5,002,333 A | * | 3/1991 | Kenmochi et al. .......... 296/204 |
| 5,020,846 A | * | 6/1991 | Bonnett ....................... 296/186 |
| 5,102,187 A | * | 4/1992 | Harasaki ..................... 296/204 |
| 5,388,885 A | * | 2/1995 | Warren .................... 296/203.01 |
| 5,527,404 A | * | 6/1996 | Warren ........................ 296/193 |
| 5,560,674 A | * | 10/1996 | Tazaki et al. ........... 296/203.01 |
| 5,593,245 A | * | 1/1997 | Herz et al. ................... 296/193 |
| 5,660,427 A | * | 8/1997 | Freeman et al. ............. 296/190 |
| 5,666,727 A | * | 9/1997 | Rashid ........................ 296/193 |
| 5,944,377 A | * | 8/1999 | Vlahovic ..................... 296/204 |
| 6,039,386 A | * | 3/2000 | Hasshi et al. ............... 296/185 |
| 6,237,989 B1 | * | 5/2001 | Ammerlaan et al. ........ 296/178 |
| 6,485,089 B2 | * | 11/2002 | Hanyu ................... 296/203.01 |

* cited by examiner

Primary Examiner—Joseph D. Pape
Assistant Examiner—G. Blankenship
(74) Attorney, Agent, or Firm—Marc J. Luddy

(57) ABSTRACT

A lightweight automobile body structure is provided and includes a base assembly including an upper sheet and a lower sheet. The upper sheet has first and second series of upper reliefs formed therein and the lower sheet has first and second series of lower reliefs formed therein. The upper and lower sheets stacked adjacent one another, whereby the first series of upper reliefs are in flush contact with the first series of lower reliefs and the second series of upper reliefs are offset from the second series of lower reliefs for defining a space therebetween. First and second side panels are fixedly attached to the base assembly and extend therefrom for defining respective sides. A roof panel is fixedly attached between the first and second side panels for defining a roof.

20 Claims, 6 Drawing Sheets

LIGHTWEIGHT AUTOMOBILE BODY STRUCTURE

FIELD OF THE INVENTION

The present invention relates to automobile body structures and more particularly to a lightweight automobile body structure.

BACKGROUND OF THE INVENTION

Automobile manufacturers continuously strive to increase vehicle fuel economy and performance through the introduction of advanced engine technology, hybrid electric or fuel cell powered drivelines, more efficient, lightweight drivelines, as well as lightweight body structures. When considering fuel economy, a vehicle's weight plays a significant role and thus, a vehicle's body structure is a major focus of weight reduction. However, the body structure plays a significant role in supporting other vehicle components, protecting passengers in cases of impact, and overall vehicle performance. Because of this, the body structure is required to maintain particular strength and impact characteristics for passenger protection, as well as bending and torsional stiffness to maintain vehicle performance.

The body structure is a load carrying mechanical member experiencing a variety of load types including concentrated, distributed, axial and torsional loads. When analyzing the body structure, three points are considered: strength, stiffness and stability. Under an applied load, the body structure's strength is its ability to resist permanent deformation. Stiffness is its ability to resist deflection and stability is its ability to retain its equilibrium configuration. Each of these points is a function of the particular cross-section, the amount of material forming the body structure, and the mechanical characteristics of the material used.

One approach to designing a lightweight body structure has been the introduction of materials that are lighter than traditional materials while maintaining comparable strength and stiffness characteristics. Some of these materials include composites, carbon fiber, aluminum, magnesium and the like. One significant drawback from using such materials is their cost, being significantly higher than that of steel and other traditional materials. Another drawback is the complex manufacturing required to form the body structure components from such materials. Manufacturing complexity increases the total vehicle cost and therefore, there is a trade off between attaining a reduced weight and increasing the vehicle cost.

Therefore, it is desirable in the industry to provide an improved lightweight automobile body structure, in particular a body frame, that maintains required strength, stiffness, and stability characteristics for meeting passenger safety and vehicle performance standards. Additionally, the body structure should be manufacturable using existing technologies and materials to attain a reduced weight without increased cost. Furthermore, the body structure should enable a total component reduction to further decrease cost and manufacturing time.

SUMMARY OF THE INVENTION

Accordingly, the present invention provides a lightweight automobile body structure. The body structure has a base assembly including an upper sheet and a lower sheet. The upper sheet has first and second series of upper reliefs formed therein and the lower sheet has first and second series of lower reliefs formed therein. The upper and lower sheets are stacked adjacent one another, whereby the first series of upper reliefs are in flush contact with the first series of lower reliefs and the second series of upper reliefs are offset from the second series of lower reliefs for defining a space therebetween. The second series of upper and lower reliefs define torque box structures, functioning as thin-walled tubular members having non-circular cross-sections.

The body structure further includes first and second side panels fixedly attached to the base assembly and extending therefrom for defining respective sides and a roof panel fixedly attached between the first and second side panels for defining a roof. In this manner, a unitized automobile body structure is provided with the upper and lower reliefs of the base assembly defining torque box sections and ribs for optimizing structural efficiency.

Further, because of the optimized structural efficiency, the upper and lower sheets of the base assembly are thin, having a thickness of no greater than 4 mm, and preferably 2 mm or less. In this manner, more expensive, lighter weight material may be used and a cost savings still achieved due to the reduced total amount of material required.

Additionally, the components of the base assembly are preferably die cast. Die casting of the components provides significant advantages including improved dimensional consistency and lower fixturing requirements over other forming methods, as well as a reduced component count, as several components may be directly formed into the base assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
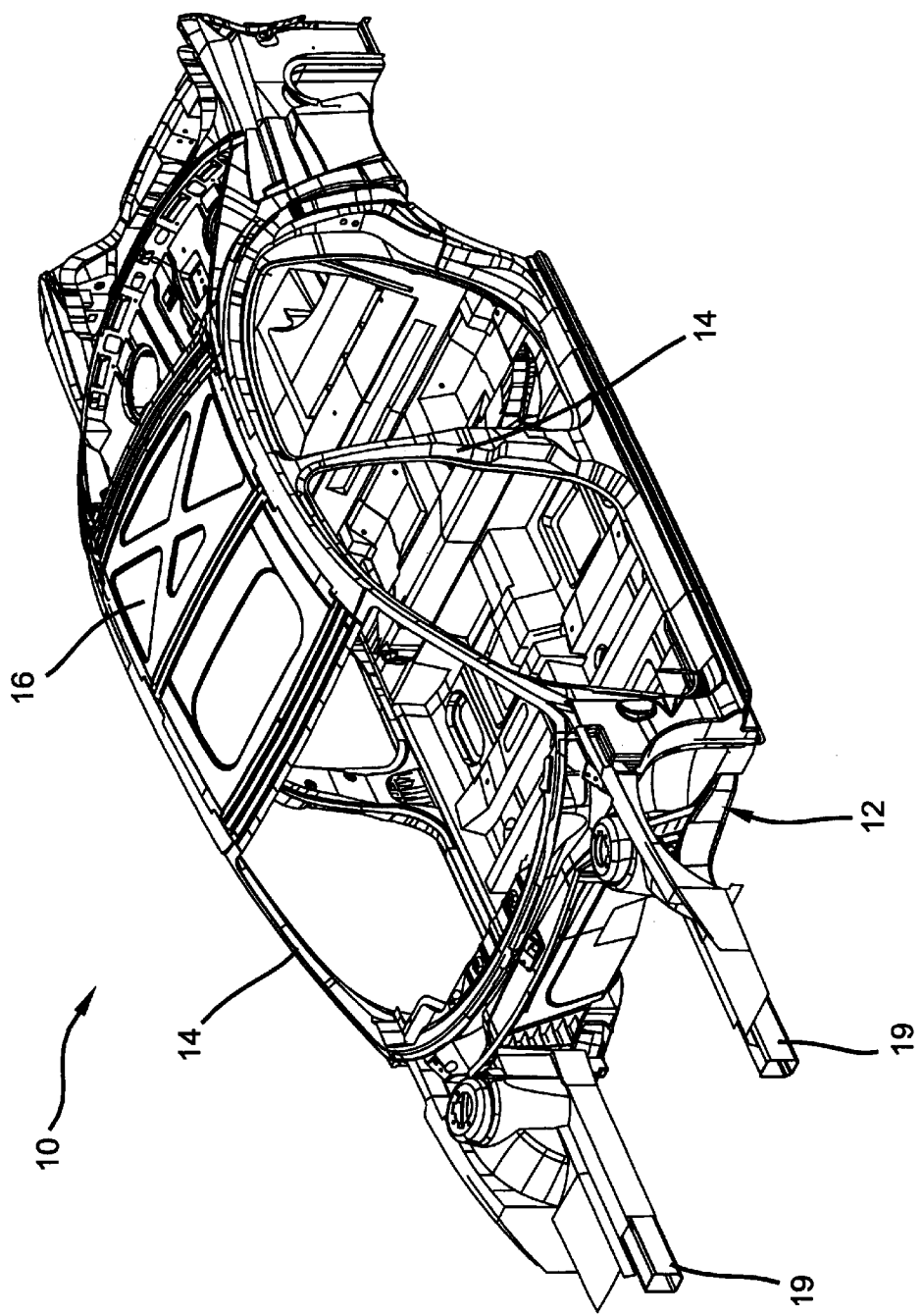
FIG. 1 is a perspective view of a lightweight automobile body structure in accordance with the principles of the present invention.

With particular reference to FIG. 1, a lightweight automobile body structure 10 is shown in accordance with the principles of the present invention. The body structure 10 includes a base assembly 12, side panels 14 and a roof panel 16. The side panels 14 are fixedly attached to the base assembly 12 and extend upward therefrom for defining sides. The roof panel 16 is fixedly attached to and disposed between the side panels 14 for defining a roof. The roof and side panels 16, 14 are preferably made from a lightweight material, such as, but not limited to, aluminum or magnesium. Also provided are a pair of forward extending frame rails 19. The frame rails 19 are preferably made from a light weight material, including aluminum, and both support other vehicle components and direct impact loads. The base assembly 12 is comprised of a plurality of integral lightweight components, which construct a unitized body structure having optimized structural efficiency.

Figure 2:
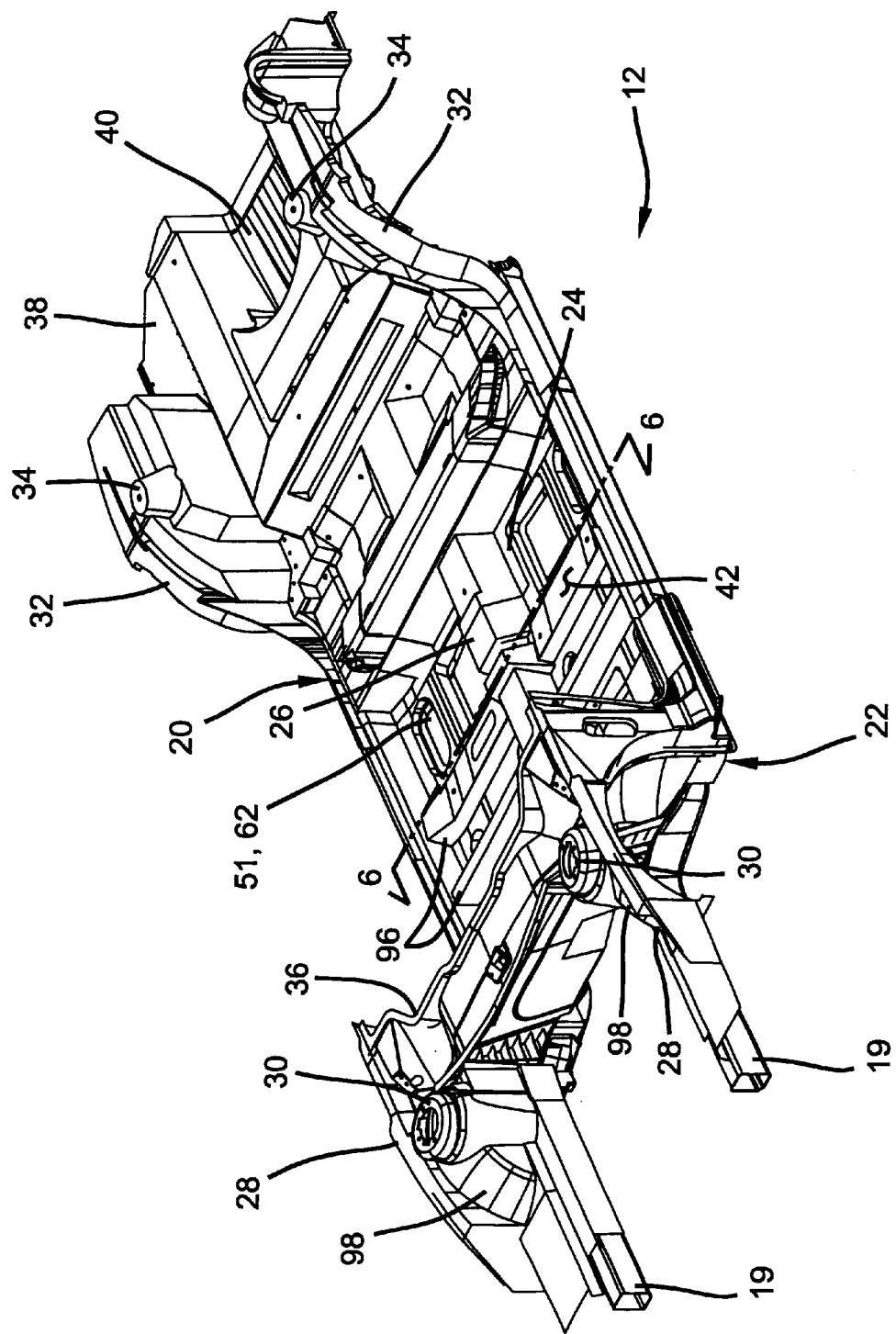
FIG. 2 is a perspective view of a base assembly of the lightweight automobile body structure of FIG. 1.
Figure 3:
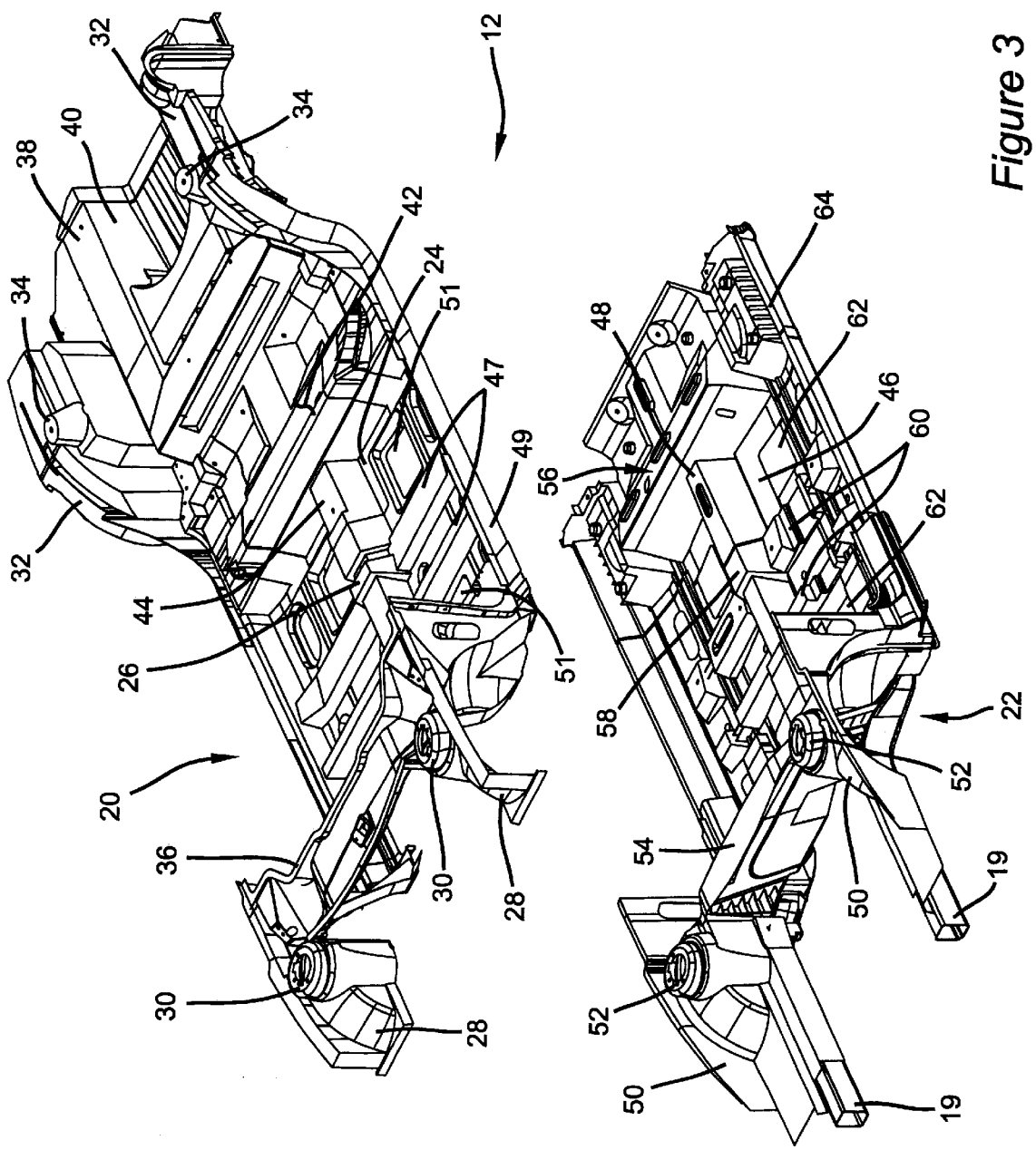
FIG. 3 is an exploded view of the base assembly of the lightweight automobile body structure of FIG. 2 depicting one preferred embodiment of components thereof.

With reference to FIGS. 2 and 3, the base assembly 12 includes upper and lower sheets 20, 22, respectfully. The upper sheet 20 is formed with first and second series of upper reliefs 24, 26, respectively, for defining particular vehicle structures. The first and second series of upper reliefs 24, 26 define front wheel housings 28, front shock towers 30, rear wheel housings 32, rear shock towers 34, a front dash panel 36, and a trunk floor 38 with wheel well 40. Further, an upper floor 42 is defined having a central column 44 extending therealong and multiple cross-columns 47 extending thereacross. A series of holes 51 are formed through the upper floor 42 for enabling efficient manufacture of the upper sheet 20. Additionally, upper flats 49 extend from portions of the perimeter of the upper sheet 20.

With particular reference to FIG. 3, the lower sheet 22 is formed with first and second series of lower reliefs 46, 48 respectively for correspondingly aligning the first and second series of upper reliefs 24, 26 of the upper sheet 20, as discussed in further detail below. The first and second series of lower reliefs 46, 48 define front wheel housings 50, front shock towers 52, and a front dash panel 54. Further, a lower floor 56 is defined having a central column 58 extending therealong and multiple cross-columns 60 extending thereacross. A series of holes 62 are formed through the lower floor 56 for enabling efficient manufacture of the lower sheet 22. Additionally, lower flats 64 extend from portions of the perimeter of the lower sheet 22 for engaging the upper flats 49 of the upper sheet 20, as discussed in further detail below.

With continued reference to FIG. 3, and in accordance with one embodiment of the present invention, the upper and lower sheets 20, 22 are preferably die cast, single-piece sheets and are made of a lightweight material, such as, but not limited to magnesium and aluminum or any other castable material known in the art. Although die casting is preferred, it is anticipated that other forming methods may be implemented, such as, but not limited to sand casting, vertical casting, or any other permanent mold casting known in the art. Die casting of the components provides significant advantages including improved dimensional consistency and lower fixturing requirements over other forming methods. Also, a reduced component count is achievable using die casting, as several components may be integrally formed into the base assembly 12, as discussed in further detail below. The thickness of the upper and lower sheets 20, 22 is preferably no greater than 2 mm (approximately 0.079 inches), which is significantly thinner than components of traditional cast body structures. The combination of the lightweight material and thin upper and lower sheets 20, 22 enables the base assembly 12 to be of a significantly reduced weight over traditional prior art vehicle structures. Additionally, lighter weight, higher strength materials, such as magnesium, may be used to form the upper and lower sheets 20, 22 while avoiding cost increases. This is due to the reduced amount of material is required. Thus, a more expensive material may be used while maintaining the overall cost, because less of the material is required.

Figure 4:
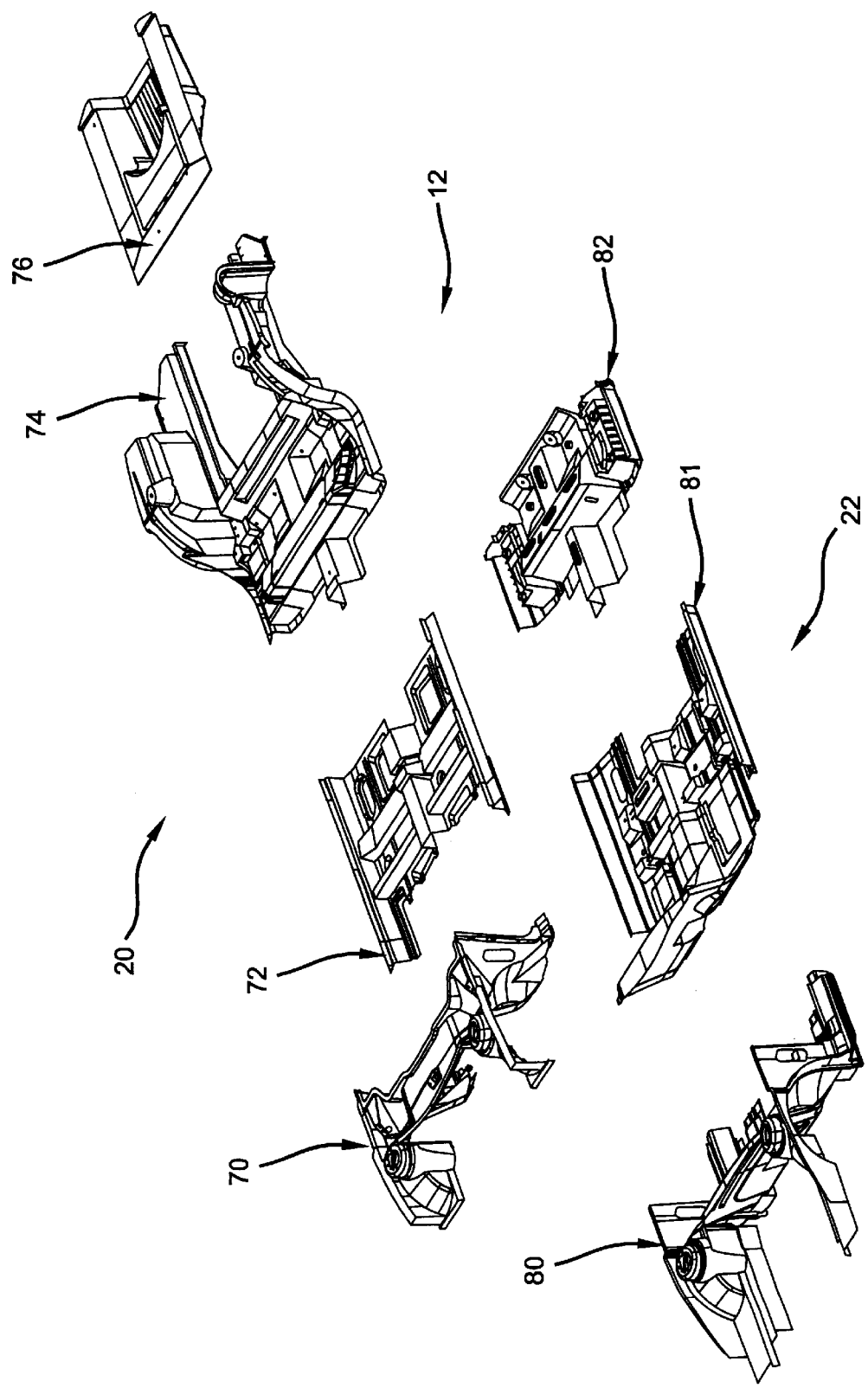
FIG. 4 is an exploded view of the base assembly of the lightweight body structure of 2 depicting an alternative preferred embodiment of components thereof.

Although it is preferred that the upper and lower sheets 20, 22 are made of a single casting, to reduce component count and assembly time, manufacturing limitations may prohibit casting of such large single sheets. Therefore, multiple sheets may be required. With particular reference to FIG. 4, and in accordance with an alternative embodiment of the present invention, the upper and lower sheets 20, 22 are each formed of multiple sheets. In particular, the upper sheet 20 may include a forward sheet 70, a floor sheet 72, a rear sheet 74, and trunk floor sheet 76. The lower sheet 22 may include a forward sheet 80, a first floor sheet 81 and a second floor sheet 82. It is to be understood that the number of multiple sheets of the embodiment of FIG. 4 is merely exemplary and can vary depending upon particular design and manufacturing constraints.

Figure 5:
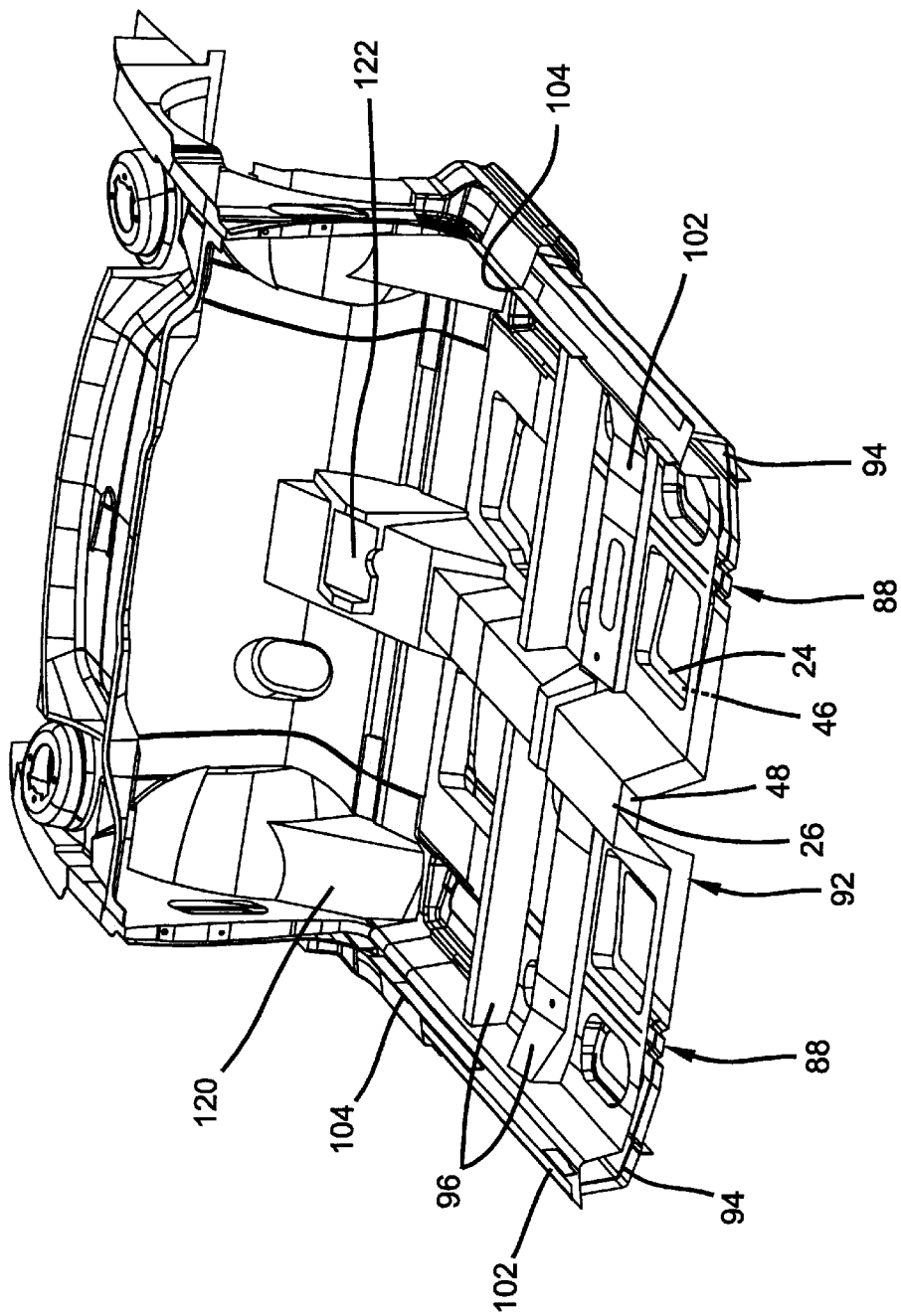
FIG. 5 is a partial cut-away view of the base assembly.
Figure 6:
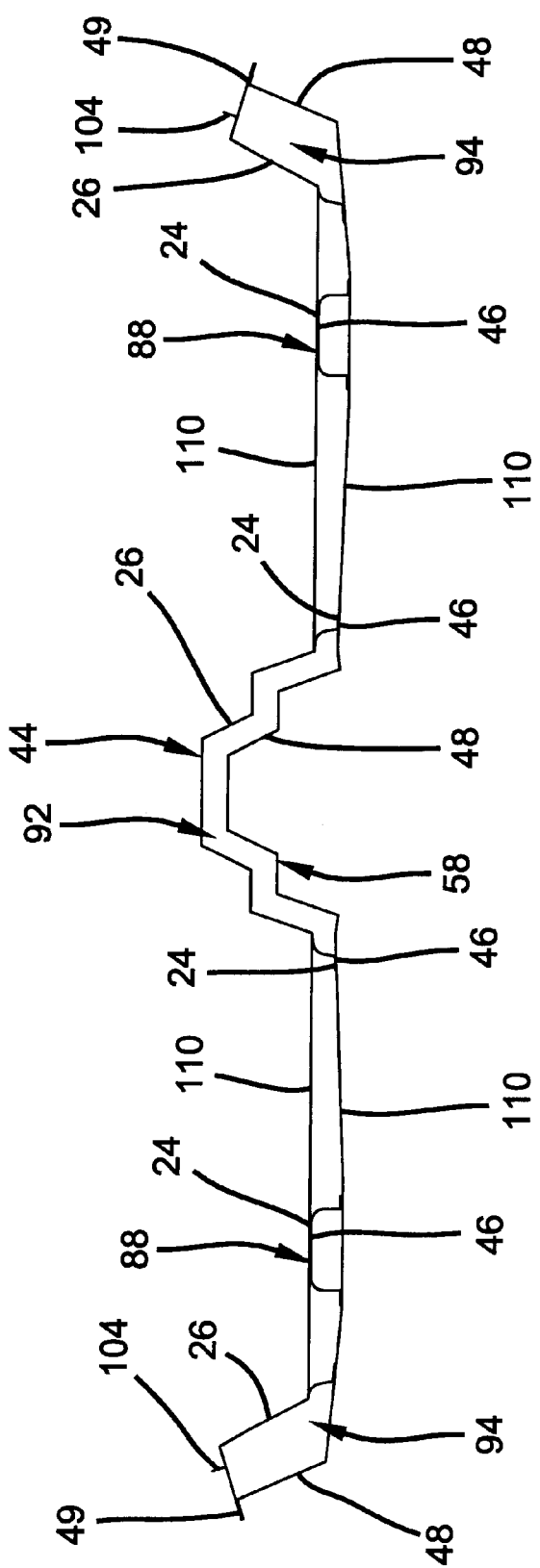
FIG. 6 is a cross-sectional view of the base assembly along line 6—6 of FIG. 2.

To form the base assembly 12, the upper and lower sheets 20, 22 are brought together and lain adjacent one another, whereby the first and second series of upper reliefs 24, 26 respectfully align with the first and second series of lower reliefs 46, 48 and the upper flats 49 align with the lower flats 64 (see FIGS. 5 and 6). More particularly, the first series of upper and lower reliefs, 24, 46 as well as the upper and lower flats, 49, 64 are respectively in flush engagement with one another for enabling bonding of the upper and lower sheets 20, 22. A number of the first series of upper and lower reliefs 24, 46 define ribs 88 for enhancing the structural integrity of the base assembly.

The second series of upper and lower reliefs 26, 48 are offset from one another for defining a space therebetween. In this manner, the upper and lower reliefs 26, 48 form the walls of box-like structures or torque boxes. The torque boxes are formed throughout the base assembly 12 for enhancing the structural integrity of the combined upper and lower sheets 20, 22. Independently, each of the upper and lower sheets 20, 22 would not have the strength, stiffness or stability required for an automotive application. However, the combined upper and lower sheets 20, 22, forming the ribs 88 and torque boxes, enable sufficient strength, stiffness, and stability.

With particular reference to FIGS. 5 and 6, the torque boxes of the present embodiment include a central torque box 92 defined by the central column reliefs 44, 58 of the upper and lower floors 42, 56, respectively side torque boxes 94 running along respective sides of the base assembly 12, transverse torque boxes 96 defined by the cross-column reliefs 47, 60, as well as front wheel housing torque boxes 98 (see FIG. 2) defined by the front and rear wheel housing reliefs 28, 50 of the upper and lower sheets 20, 22. Each of these torque boxes 92, 94, 96, 98 adds to the structural integrity of the base assembly, providing the requisite strength, stiffness and stability.

In addition to the upper and lower sheets 20 including the reliefs, each is preferably formed to include fixturing and alignment bosses 102 and seal flanges 104. The seal flanges 104 provide a structure to which the side panels 14 are secured. The fixturing and alignment bosses 102 provide a structure to enable external tooling to securely grasp the upper and lower sheets 20, 22 for transport during manufacture, in addition to ensuring proper alignment of the upper and lower sheets 20, 22 as they are brought together for assembly.

Joining of the upper and lower sheets 20, 22 may be achieved in various manners known in the art, including adhesive, welding or riveting. Adhesive joining is preferred to maintain a lightweight structure, as well as enabling reduced manufacturing time and cost over welding or riveting. To achieve the adhesive joining, an adhesive agent is spread along mating surfaces of the first series of upper and lower reliefs 24, 46, as well as surfaces of the upper and lower flats 46, 64, prior to joining of the upper and lower sheets 20, 22. Once joined, the adhesive agent is cured to secure the upper and lower sheets 20, 22.

Additionally, panels 110 are provided to cover the holes 51, 62 formed through the upper and lower sheets 20, 22. The panels 110 are preferably made from a lighter weight material than that of the upper and lower sheets 20, 22 and cover the holes 51, 62 to provide sound insulation for the interior of the finished vehicle.

In addition to the reliefs of the upper and lower sheets 20, 22 defining torque boxes 92, 94, 96, 98 and ribs 88, auxiliary reliefs may be defined in either or both of the upper and lower sheets 20, 22 to provide integrally formed components that would otherwise be separate components assembled to the base assembly 12. As discussed above, the upper and lower reliefs 24, 26, 46, 48 define front and rear shock towers 30, 52, 34. Additional reliefs are included in the upper sheet 20 to define a foot rest 120 and an HVAC mount 122 (see FIG. 5). Traditionally, each would be an external component fixed to the base assembly 12 during manufacture. However, the die cast foot rest eliminates the need for extra foot rest and HVAC mount components and assembly thereof, thereby reducing overall component count and manufacturing cost. Similarly, it is anticipated that other components may be integrally formed with the base assembly 12, including, but not limited to, floor console mounting brackets, shift and park brake mounting brackets, spare tire hold-down brackets, and the like.

The base assembly 12 of the present invention comprises a plurality of thin-walled, lightweight sheets joined together to form a load carrying member. The base assembly 12 has reliefs formed therein to define various torque boxes 92, 94, 96, 98 and ribs 88, which increase the structural integrity of the base assembly 12 thereby enabling sufficient strength, stiffness, and stability characteristics. In this manner, a structurally optimized, load carrying member is provided. Further, the method used to form the base assembly 12 enables improved dimensional consistency and reduces the fixturing required during manufacture. Additional components may also be integrally formed into the sheets for further reducing overall cost by reducing external component count and assembly time.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lightweight automobile body structure, comprising:
a base assembly including an upper sheet and a lower sheet, said upper sheet having a first and a second series of upper reliefs formed therein and said lower sheet having a first and a second series of lower reliefs formed therein, said upper and lower sheets stacked adjacent one another wherein said first series of upper reliefs are in flush contact with said first series of lower reliefs and said second series of upper reliefs are offset from said second series of lower reliefs for defining at least one torque box;
first and second side panels fixedly attached to said base assembly and extending therefrom for defining respective sides; and
a roof panel fixedly attached between said first and second side panels for defining a roof;
where said upper and lower sheets further define mating shock tower reliefs.

2. The lightweight automobile body structure of claim 1, where said upper sheet comprises a forward upper sheet, a floor upper sheet and a rear upper sheet.

3. The lightweight automobile body structure of claim 1, where said lower sheet comprises a forward lower sheet and a floor lower sheet.

4. The lightweight automobile body structure of claim 1, where said upper and lower sheets each include a hole formed therethrough for reducing a weight of said upper and lower sheets.

5. The lightweight automobile body structure of claim 4, where respective panels are fixedly attached to said upper and lower sheets for covering said hole, said panels being made of a material having a lower density than a material from which said upper and lower sheets are formed.

6. The lightweight automobile body structure of claim 1, further comprising frame rails fixedly attached to said lower sheet and extending therefrom.

7. The lightweight automobile body structure of claim 1, where said upper and lower sheets are die cast.

8. The lightweight automobile body structure of claim 1, where said upper and lower sheets are made from magnesium.

9. The lightweight automobile body structure of claim 1, where said upper and lower sheets each include alignment bosses formed therein for facilitating accurate alignment between said upper and lower sheets.

10. The lightweight automobile body structure of claim 1, where said upper and lower sheets each have a thickness no greater than 0.079 inches.

11. The lightweight automobile body structure of claim 1, where said upper sheet defines a foot rest.

12. A base assembly for an automobile body structure, comprising: an upper sheet having a first and a second series of upper reliefs formed therein; and a lower sheet having a first and a second series of lower reliefs formed therein, said upper and lower sheets stacked adjacent one another wherein said first series of upper reliefs arc in flush contact with said first series of lower reliefs and said second series of upper reliefs are offset from said second series of lower reliefs for defining a space therebetween; where said upper and lower sheets further include mating shock lower reliefs.

13. The base assembly of claim 12, where said upper sheet comprises a forward upper sheet, a floor upper sheet and a rear upper sheet.

14. The base assembly of claim 12, where said lower sheet comprises a forward lower sheet and a floor lower sheet.

15. The base assembly of claim 12, where said upper and lower sheets further each include a hole formed therethrough for reducing a weight of said upper and lower sheets.

16. The base assembly of claim 15, where respective panels are fixedly attached to said upper and lower sheets for covering said hole, said panels being made of a material having a lower density than a material from which said upper and lower sheets are formed.

17. The base assembly of claim 12, further comprising frame rails fixedly attached to said lower sheet and extending therefrom.

18. The base assembly of claim 12, said upper and lower sheets are die cast.

19. The base assembly of claim 12, said upper and lower sheets include magnesium.

20. The base assembly of claim 12, said upper and lower sheets each include alignment bosses formed therein for facilitating accurate alignment between said upper and lower sheets as said upper and lower sheets are stacked adjacent one another.

* * * * *